United States Patent [15] 3,691,472

Bohman [45] Sept. 12, 1972

[54] ARRANGEMENT FOR THE GENERATION OF PULSES APPEARING AS PSEUDO-RANDOM NUMBERS

[72] Inventor: Erik Harald Bohman, Saltsjobaden, Sweden

[73] Assignee: Telefonaktiebolaget LM Ericsson, Stockholm, Sweden

[22] Filed: June 29, 1967

[21] Appl. No.: 650,102

[52] U.S. Cl. ........................328/63, 328/37, 328/48, 328/61, 331/78

[51] Int. Cl. ..............................................H03k 13/00

[58] Field of Search .....307/221; 331/78; 328/37, 48, 328/61, 63

[56] References Cited

UNITED STATES PATENTS 3,439,279 4/1969 Guanella .....................331/78

*Primary Examiner*—Benjamin A. Borchelt
*Assistant Examiner*—R. Kinberg
*Attorney*—Hane and Nydick

[57] ABSTRACT

An arrangement for generating a binary pulse code in which pulses appear as pseudo-random numbers, the pulse code preferably being used for ciphering binary information, comprises a number of shift registers in which the output of one or several stages is connected to the input of the first stage of the register via logical circuits, the registers being cyclically shifted from a common pulse generator. The input of the first stage of each shift register is also connected to one input of a gate. The gates are interconnected so as to form a chain in which each gate has one input connected to the output of the preceding gate, and the other input being connected to the appertaining shift register. Each second gate is an AND-gate and each other second gate is an exclusive-OR-gate, the output of the last gate in the chain constituting the output of the arrangement.

5 Claims, 6 Drawing Figures

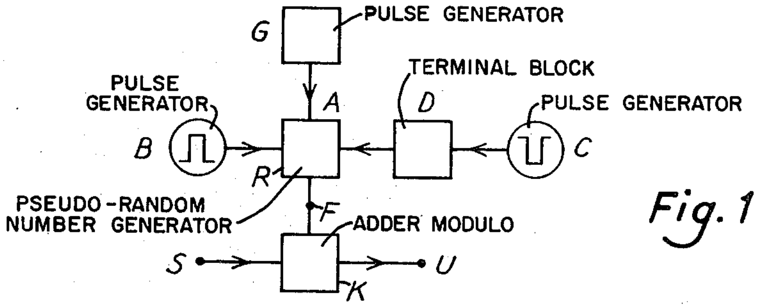
Fig. 1
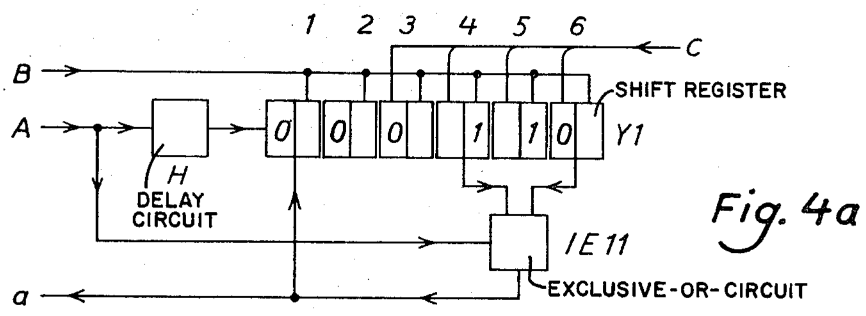
Fig. 4a
| T | A | 1 | 2 | 3 | 4 | 5 | 6 | a |
|---|---|---|---|---|---|---|---|---|
| t0 | | 0 | 0 | 0 | 1 | 1 | 0 | |
| t1 | 1 | 1 | 0 | 0 | 1 | 1 | 0 | 1 |
| t2 | | 0 | 1 | 0 | 0 | 1 | 1 | |
| t3 | 1 | 1 | 1 | 0 | 0 | 1 | 1 | 1 |
| t4 | | 0 | 1 | 1 | 0 | 0 | 1 | |
Fig. 4b
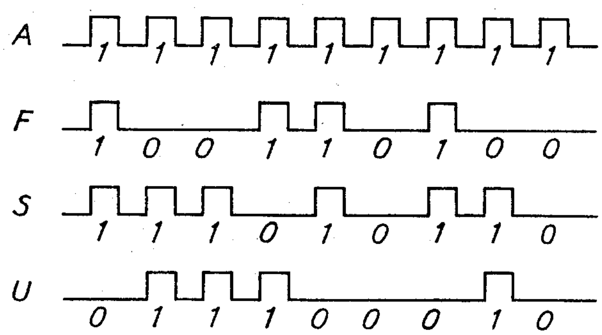
Fig. 5
INVENTOR
Eric Harald Bohman
BY Hane and Nydick
ATTORNEYS INVENTOR
ERIC HARALD BOHMAN
BY Hane and Nydick
ATTORNEYS INVENTOR
ERIC HARALD BOHMAN
BY Hane and Nydick
ATTORNEYS

ARRANGEMENT FOR THE GENERATION OF PULSES APPEARING AS PSEUDO-RANDOM NUMBERS

This invention pertains to pseudo-random binary number generators particularly useful for ciphering binary information.

THE INVENTION

An object of the invention is to provide an improved pseudo-random number generator for ciphering binary information.

SUMMARY OF THE INVENTION

Briefly, the invention contemplates apparatus for producing a binary pulse code comprising a plurality of shift registers which are shifted by a common pulse source wherein the output of the last stage of each register is connected to an input of the first stage of the same register. There is an open chain of two-input logic circuits which alternate between AND-circuits and exclusive-OR-circuits. The first circuit in the chain is connected to the outputs of two different shift registers. The remaining logic circuits in the chain have one input connected to the output of a shift register and the other input to the output of the preceding logic circuit of the chain. The output of the last logic circuit in the chain is the output of the apparatus.

Figure 2:
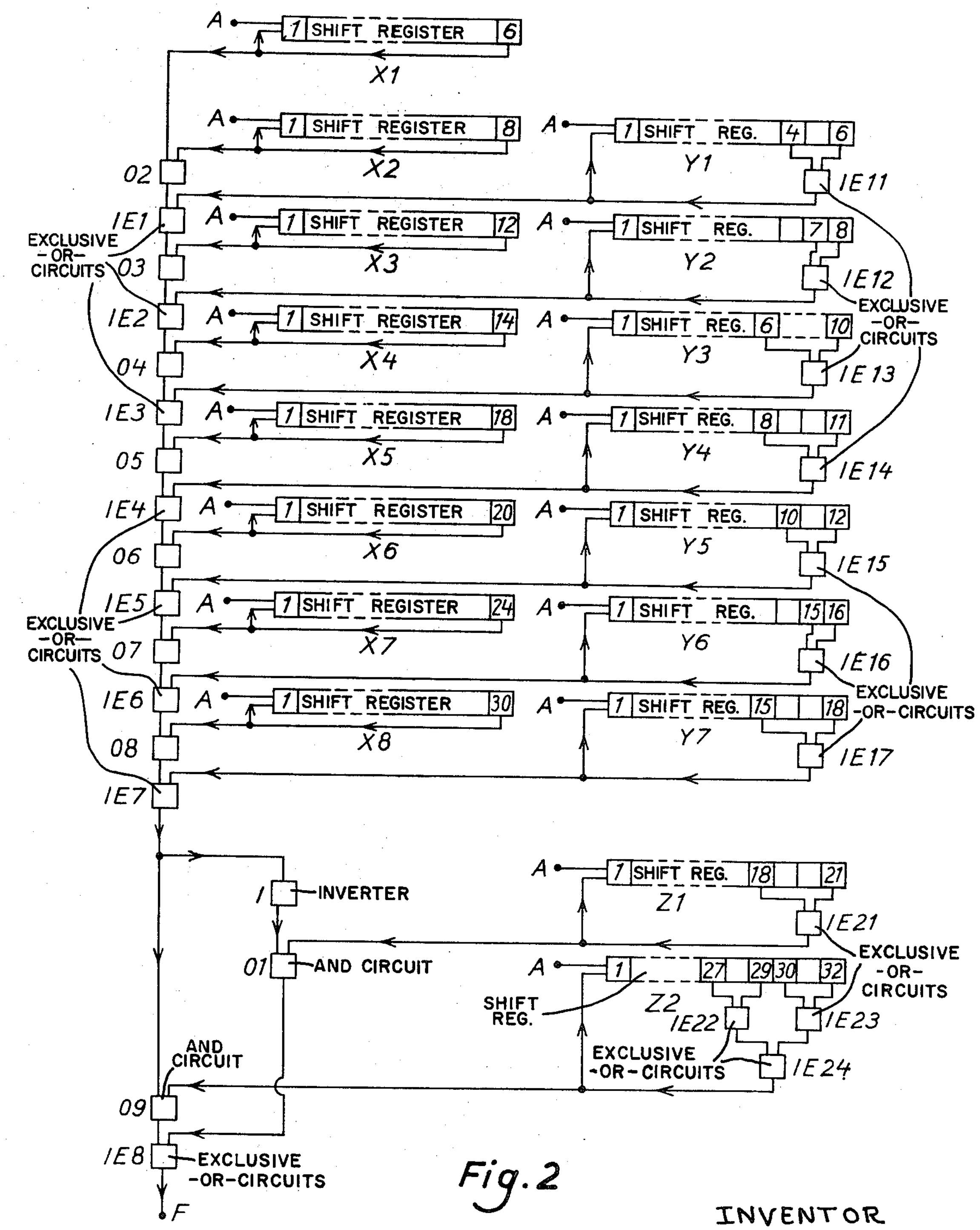
Figure 3:
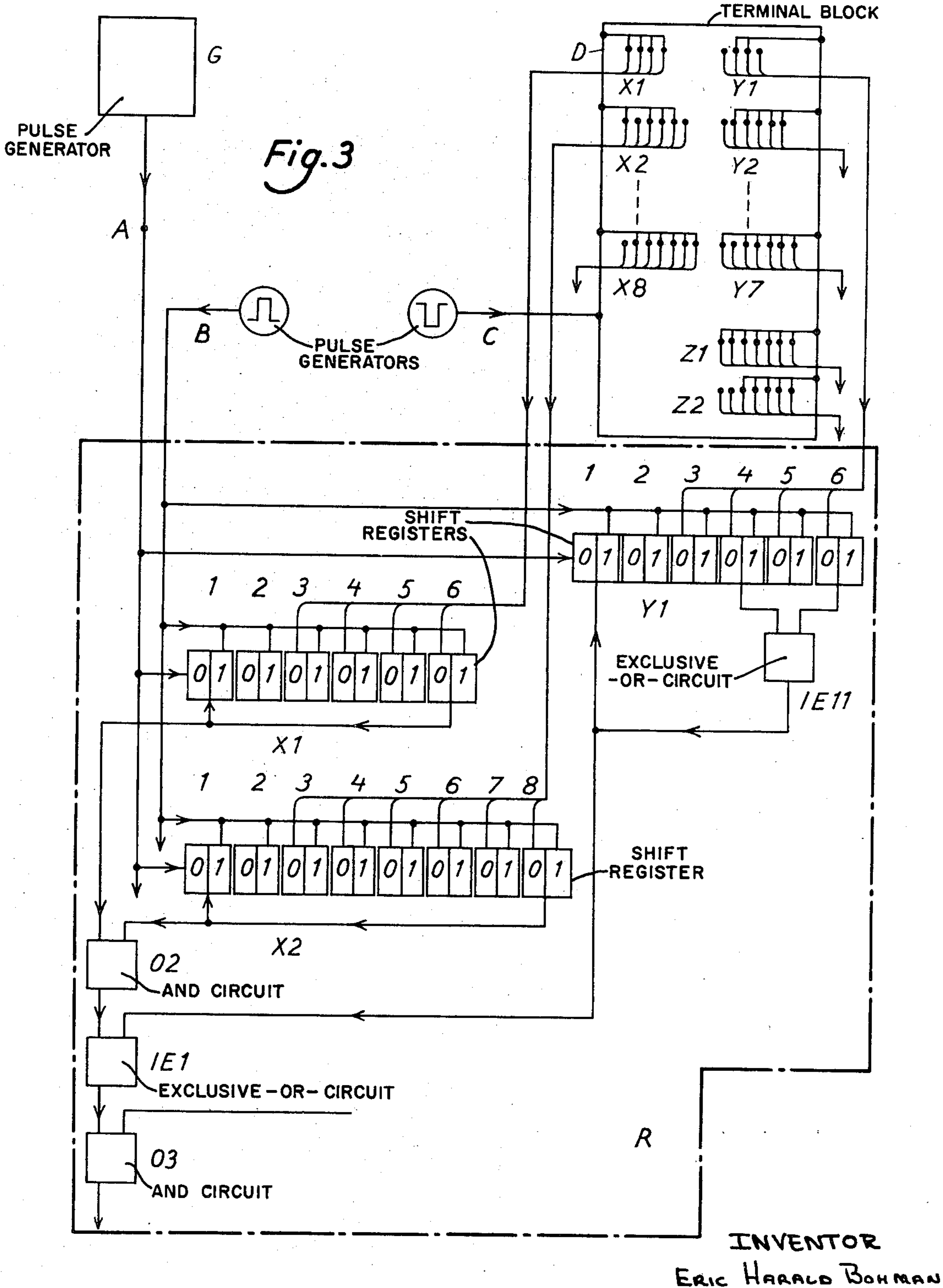

The invention will be more particularly described with reference to the accompanying drawing, in which FIG. 1 shows an arrangement for the ciphering of information existing in digital form, FIG. 2 shows that part of the arrangement which in accordance with the invention transforms an incoming pulse train into a binary pulse code, in which the pulses appear as pseudo-random numbers, FIG. 3 shows the arrangement used for producing a "key" in the ciphering arrangement, FIGS. 4*a* and 4*b* show in detail the manner of working of the two types of shift register included in the arrangement according to FIG. 2, and FIG. 5 finally shows the form of those pulse trains which appear in different parts of the arrangement according to FIG. 1.

FIG. 1 shows diagrammatically an arrangement for ciphering of information converted into digital form. G is a pulse generator that supplies a pulse train via line A to the unit R. In the unit R, a pseudo-random number generator, the pulse train is transformed into a binary pulse code in which the pulses appear as pseudo-random numbers. The pulse code obtained is received from the unit R at the output F. The units B,C and D make it possible that certain shift registers included in the unit R can be preset to desired positions. Consequently, it is possible to build in a "key" into the unit R. The pulse code obtained from output F is supplied to the unit K which also receives the digital information from line S. In the unit K, a modulo-2 adder, the pulse trains incoming from lines F and S are added modulo 2, the result being obtained at the output U. In FIG. 5 are shown examples of the pulse train at different points in the arrangement of FIG. 1. Line A shows, accordingly, the pulses arriving from the pulse generator G which pulses in the example shown consist of "ones". On line F is shown how this pulse train has been transformed in the unit R into a pulse code comprising "ones" and "zeros". Line S shows an example of information in digital form that is ciphered by means of the code from unit R. Line U finally shows the result which is obtained when the pulse series on lines F and S are added modulo 2. The pulse series on line U is then sent out through a transmission medium. If, in the receiver, the original information is to be decoded from the pulse series on line U, the series on lines U and F have to be added modulo 2.

In FIG. 2 is shown in detail the pseudo-random number generator unit R by means of which an incoming pulse train is transformed into a binary pulse code in which the pulses appear as pseudo-random numbers. The unit comprises a chain of alternating and-circuits, 02–09, and exclusive-or-circuits, IE1–IE8, and a branch parallel to the chain comprising an and-circuit 01 and an inverter or not-circuit I. The circuits are connected in such a way that the output from circuit $0(k+1)$ is connected to a first input on the circuit IE$k$ where $k=1,2,\ldots.n$. Furthermore the output from circuit IE$k$ is connected to a first input of circuit $0(k+2)$ where $k=1,2,\ldots,(n-1)$, and the output of circuit IE$n-1$ is connected to an input on the not-circuit I and a first input of and-circuit $0(n+1)$. The output from the not-circuit I is connected to a second input of and-circuit 01, the output of which is connected to a second input of exclusive-or-circuit IEn. In the shown example $n=8$.

The arrangement furthermore comprises three groups of shift registers, each register comprising a number of bistable circuits. The shift registers in the first group comprise the registers X1–X8, in the second group the registers Y1–Y7 and in the third the registers Z1 and Z2. The input to all registers is connected to the input A of the unit R. The output of each register X is connected to the input of the respective register, and to an and-circuit in the chain. The output from the register X1 is then connected to a first input of the and-circuit 02 and the output from register X$k$ is connected to a second input of the and-circuit 0$k$ where $k=2,3,\ldots n$. In each register Y two definite bistable circuits are connected to an additional exclusive-or-circuit , IE11–IE17, the output of which is connected to the output of the respective register, which in its turn is connected to the input of the register and to an input of an exclusive-or-circuit. The registers Y are connected to the exclusive-or-circuits in such a way that the output of the register Y$k$ is connected to a second input of the exclusive-or-circuit IE$k$, where $k=1,2,\ldots,(n-1)$. In the register Z1 two definite bistable circuits are connected to an additional exclusive-or-circuit IE21, the output of which is connected to the input of the register Z1 and to a second input of the and-circuit 01. In the register Z2 two pairs of bistable circuits are connected to additional exclusive-or-circuits IE22 and IE23. The outputs of these circuits are in their turn connected to a further, additional exclusive-or-circuit IE24 which has its output connected to the input of the register Z2 and also to a second input of the and-circuit 09 in said chain.

In the registers X, the number of bistable circuits is chosen in such a way that for register Xk the number of bistable circuits is $p_k+1$ where $p1,p2,\ldots$ pn constitute $n$ different prime numbers. In the registers, X1–X8 the number of bistable circuits are 6,8,12,14,18,20,24 and 30 respectively. Each register X functions in such a way that when a pulse is at the input of the register this will imply that the contents of the last bistable circuit of the register is applied to the output of the register and is also transmitted to the first bistable circuit in the register. Then the register will be shifted one stage to the right.

The function of a register Y is similar to that of a register X. In the registers Y the condition in those bistable circuits which are connected to the additional exclusive-or-circuit is scanned each time a pulse arrives at the input of the register. The function of a register Y is shown in detail in FIGS. 4*a* and 4*b*. In FIG. 4*a* is shown the register Y1 which has two of its bistable circuits No.4 and 6 connected to an additional exclusive-or-circuit IE11. The register Y1 contains a total of 6 bistable circuits. Between the input of the register and the input A of the arrangement is connected a delay circuit H. The input A of the unit R is directly connected to the exclusive-or-circuit IE11. The output of circuit IE11 is connected to the first bistable circuit in the register and to the output *a*. When the pulse comes to the register at line A the condition of the positions 4 and 6 in the register will first be detected. The received pulses are supplied to circuit IE11 and the result is supplied to the output *a* simultaneously as it is introduced into the bistable circuit 1 in the register. Not until then are all positions in the register shifted one stage to the right. The delay circuit H is inserted in order that the scanning of the bistable circuits and the applying of the result to the exclusive-or-circuit can take place before the register has been shifted.

The procedure in the register is illustrated in FIG. 4*b*. In column T are indicated points of time, in column A the condition of the input A of the unit, in column *a* the condition of the input of the register connected to the output of circuit IE11, and in the columns 1–6 the condition of each of the respective bistable circuit of the register. At the moment t0 the register has its supposed original position. At the instant or moment *t*1 the first pulse has arrived and scanning has taken place. At the moment *t*2 the register has been shifted one stage to the right. At time *t*3 the next pulse in the pulse train has been received and the scanning has been carried out. At time *t*4 the register has been shifted again one stage to the right. In the example shown the bistable circuit No.1 in the register is always to be set equal to zero in connection with the shifting.

The function of the registers Z corresponds to that described for the registers Y. Due to this structure of the Y- and Z-registers, these registers deliver pulses according to a so-called maximum-length-sequence, i.e. a sequence of "zeros" and "ones" with maximum length of period according to the theory of primitive polynomials through a Galois-field, implying that the length of period is ( $2^{r-1} - 1$) where $r$ is the number of stages in the shift register.

In FIG. 4*a* there is also indicated a possibility for presetting certain bistable circuits in the register. By means of a pulse on the input from pulse generator B all bistable circuits in the register can be pre-set to 1. By means of a pulse on the input from pulse generator C all bistable circuits except the two first circuits can be set to "zero." Thus in this way a "key" can be adjusted in the ciphering arrangement.

This is illustrated more fully in FIG. 3 which shows the pulse generator G, the pulse generators B and C, the terminal block D and registers X1,X2 and Y1 included in the unit R. All bistable circuits in the registers are connected to the pulse generator B, by means of which all bistable circuits can be set to 1. In each register all bistable circuits except the two first circuits are furthermore connected to a terminal block in which are found contact means corresponding to the respective register. In this terminal block, local connections can be made, in FIG. 3 illustrated by connections in the unit D. This is in its turn connected to the pulse generator C from which it is thus possible to set definite bistable circuits in each register to "zero" through the connections carried out in the terminal block depending on the local connections that have been carried out. The two first bistable circuits in each register cannot be set to "zero" in order that one should be sure that at the beginning of the operator all registers contain a value that is different from "zero" . A register containing "-zero" at the beginning of the operation will viz. not be changed during the time the pulse train is supplied and this counteracts the purpose of the arrangement. Before the pulse train is supplied, all bistable circuits in all registers will be brought into 1-position by means of a pulse from generator B, and the definite bistable circuits will be brought into 0-condition by means of a pulse from generator C. Then the pulse train from source G has to be supplied.

As a practical embodiment of the unit R in accordance with the example in FIG. 2 the following numbers of devices in the means, i.e. registers per group, bistable circuits per register and bistable circuits connected to additional exclusive-or-circuits, are indicated:

| Type of register number of registers | Reg. No. | Number of bistable circuits | Bistable circuits connected to IE-circuits |
|---|---|---|---|
| X | 1 | 6 | |
| (8) | 2 | 8 | |
| | 3 | 12 | |
| | 4 | 14 | |
| | 5 | 18 | |
| | 6 | 20 | |
| | 7 | 24 | |
| | 8 | 30 | |
| Y | 1 | 6 | 4,6 |
| (7) | 2 | 8 | 7,8 |
| | 3 | 10 | 6,10 |
| | 4 | 11 | 8,11 |
| | 5 | 12 | 10,12 |
| | 6 | 16 | 15,16 |
| | 7 | 18 | 15,18 |
| Z | 1 | 21 | 18,21 |
| (2) | 2 | 32 | 27,29,30, 32 |

I claim:

1. Apparatus for producing a binary pulse code in which the pulses represent pseudo-random numbers comprising: a common pulse source; a plurality of multistage shift registers, each of said shift registers having a shift signal input connected to said common pulse source, a register input connected to the first stage of the register and a register output connected to the last stage of the register, means for connecting said register output to said register input of each of said multi-stage shift registers; a plurality of two-input logic circuits serially connected to form an open chain, said logic circuits sequentially alternating between and-circuits and exclusive-or-circuits; means for connecting the two inputs of the first logic circuit of the open chain to the register outputs of two of said shift registers; means for connecting one input of each of the remaining logic circuits to the register output of a different one of said shift registers, respectively; and means for connecting the other input of each of said remaining logic circuits to the output of the preceding logic circuit of the open chain; a pseudo-random number pulse output; and output connecting means for connecting the output of the last logic circuit in the open chain to said pseudo-random number pulse output.

2. The apparatus of claim 1 wherein each of said means for connecting a register output to a register input comprises a two-input exclusive-or-circuit, means for connecting one input of said exclusive-or-circuit to said register output, means for connecting the other input of said exclusive-or-circuit to the output of a different stage of said shift register, and means for connecting the output of said exclusive-or-circuit to said register input.

3. The apparatus of claim 2 wherein said different stage is chosen in such a way that at the register output there is obtained a sequence of binary units having a period length of $n$ bits, where $n=2^{(4-1)}-1$ and $r$ equals the number of stages in the shift register.

4. The apparatus of claim 1 wherein said output connecting means comprises first and second further two-input and-circuits, a further two-input exclusive-or-circuit, first and second further multi-stage shift registers each having a shift signal input connected to said common pulse source, a register output and a register input connected to said register output, means for connecting the register output of said first further shift register to one input of said first further and-circuit, means for connecting the output of the last exclusive-or-circuit of said open chain to the second input of said first further and-circuit, means for connecting the register output of said second further shift register to one input of said second further and-circuit, not-circuit means connecting the output of the last exclusive-or-circuit of said open chain to the other input of said second further and-circuit, means for connecting the outputs of said first and second further and-circuits to the two inputs of said further exclusive-or-circuit, and means for connecting the output of said further exclusive-or-circuit to said pseudo-random number pulse output.

5. The apparatus of claim 1 further comprising means for selectively pre-setting stages of said shift registers.

* * * * *